(12) United States Patent
Furusako et al.

(10) Patent No.: US 10,828,717 B2
(45) Date of Patent: Nov. 10, 2020

(54) LAP WELDING METHOD OF STEEL SHEET AND LAP WELD JOINT OF STEEL SHEET

(71) Applicant: NIPPON STEEL & SUMITOMO METAL CORPORATION, Tokyo (JP)

(72) Inventors: Seiji Furusako, Tokyo (JP); Tohru Okada, Tokyo (JP); Koichi Sato, Tokyo (JP); Yasunobu Miyazaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 339 days.

(21) Appl. No.: 15/752,962

(22) PCT Filed: Sep. 16, 2016

(86) PCT No.: PCT/JP2016/077456
§ 371 (c)(1),
(2) Date: Feb. 15, 2018

(87) PCT Pub. No.: WO2017/047752
PCT Pub. Date: Mar. 23, 2017

(65) Prior Publication Data
US 2018/0236589 A1    Aug. 23, 2018

(30) Foreign Application Priority Data
Sep. 16, 2015 (JP) .................. 2015-182846

(51) Int. Cl.
*B23K 11/11* (2006.01)
*B23K 26/346* (2014.01)
(Continued)

(52) U.S. Cl.
CPC .......... *B23K 11/11* (2013.01); *B23K 11/0026* (2013.01); *B23K 11/16* (2013.01);
(Continued)

(58) Field of Classification Search
CPC ...... B23K 11/11; B23K 26/244; B23K 26/32; B23K 11/16; B23K 11/0026;
(Continued)

(56) References Cited

U.S. PATENT DOCUMENTS 5,942,138 A * 8/1999 Toda .................. B29C 64/141
219/121.72
9,399,491 B2 * 7/2016 Watanabe .............. B62D 25/04
(Continued)

FOREIGN PATENT DOCUMENTS

CN    102652068 A    8/2012
CN    104125872 A    10/2014
(Continued)

OTHER PUBLICATIONS

Extended European Search Report dated Apr. 23, 2019, for counterpart European Application No. 16846623.3.
(Continued)

*Primary Examiner* — Donnell A Long
(74) *Attorney, Agent, or Firm* — Birch, Stewart, Kolasch & Birch, LLP.

(57) ABSTRACT

A lap welding method of a steel sheet includes spot welding in a state in which the flange portion of a second steel sheet member having the flange portion and a standing wall portion is overlapped with the first steel sheet member, thereby forming a nugget between a first steel sheet member and a flange portion; and, after the spot welding, laser welding a region between an R stop of the standing wall portion and the nugget, thereby forming a weld bead, and, in the weld bead, a length dimension is equal to or longer than a diameter of the nugget, and a width dimension is 0.5 to 3.0 mm.

14 Claims, 13 Drawing Sheets

(51) Int. Cl.
*B23K 26/244* (2014.01)
*B23K 26/32* (2014.01)
*B23K 11/16* (2006.01)
*B23K 28/02* (2014.01)
*B23K 26/21* (2014.01)
*B23K 11/00* (2006.01)
*B23K 101/18* (2006.01)
*B23K 103/04* (2006.01)

(52) U.S. Cl.
CPC ............ *B23K 26/21* (2015.10); *B23K 26/244* (2015.10); *B23K 26/32* (2013.01); *B23K 26/346* (2015.10); *B23K 28/02* (2013.01); *B23K 2101/18* (2018.08); *B23K 2103/04* (2018.08)

(58) Field of Classification Search
CPC ...... B23K 26/346; B23K 28/02; B23K 26/21; B23K 2101/18; B23K 2103/04; B23K 2101/006; B23K 33/00
See application file for complete search history.

(56) References Cited

U.S. PATENT DOCUMENTS

| | | | | |
|---|---|---|---|---|
| 9,636,781 | B2* | 5/2017 | Hisada | B23K 26/22 |
| 9,868,176 | B2* | 1/2018 | Chiashi | B23K 20/1265 |
| 9,956,647 | B2* | 5/2018 | Parrish | B23K 26/32 |
| 10,071,774 | B2* | 9/2018 | Yoshida | B23K 9/0026 |
| 10,195,684 | B2* | 2/2019 | Rottger | B23K 11/34 |
| 2006/0043076 | A1* | 3/2006 | Larsson | B23K 11/061 |
| | | | | 219/121.64 |
| 2007/0007254 | A1* | 1/2007 | Wang | B23K 11/061 |
| | | | | 219/91.22 |
| 2008/0210672 | A1 | 9/2008 | Meyer et al. | |
| 2009/0302094 | A1* | 12/2009 | Milam | B23K 11/0033 |
| | | | | 228/196 |
| 2011/0008648 | A1* | 1/2011 | Okitsu | B23K 9/23 |
| | | | | 428/683 |
| 2011/0272384 | A1* | 11/2011 | Matsushita | B23K 11/115 |
| | | | | 219/91.2 |
| 2014/0147693 | A1 | 5/2014 | Yasuyama et al. | |
| 2015/0174702 | A1 | 6/2015 | Fujimoto et al. | |
| 2015/0314392 | A1 | 11/2015 | Haschke et al. | |
| 2017/0008124 | A1 | 1/2017 | Fujimoto et al. | |
| 2017/0008573 | A1 | 1/2017 | Otsuka et al. | |

FOREIGN PATENT DOCUMENTS

| | | | |
|---|---|---|---|
| DE | 100 48 233 A1 | 4/2002 | |
| DE | 10048233 A1 * | 4/2002 | ............ B23K 26/60 |
| EP | 0988917 B1 | 8/2003 | |
| EP | 0937841 B1 | 4/2004 | |
| JP | 2007-167916 A | 7/2007 | |
| JP | 2008-178905 A | 8/2008 | |
| JP | 4593458 B2 | 12/2010 | |
| JP | 2013-223872 A | 10/2013 | |
| JP | 2014-15206 A | 1/2014 | |
| RU | 2389591 C2 | 5/2010 | |
| SU | 1579682 A1 | 7/1990 | |
| WO | WO 2006/051022 A1 | 5/2006 | |
| WO | WO 2015/119159 A1 | 8/2015 | |
| WO | WO 2015/133531 A1 | 9/2015 | |

OTHER PUBLICATIONS

Japanese Office Action for Japanese Application No. 2017-540004, dated Apr. 9, 2019, with English translation.
Russian Office Action and Search Report, dated Dec. 24, 2018, for counterpart Russian Application No. 2018108302, with an English translation.
Chinese Office Action and Search Report, dated Apr. 3, 2019, for counterpart Chinese Application No. 201680051844.6, with an English translation of the Search Report.
International Search Report for PCT/JP2016/077456 dated Nov. 8, 2016.
Written Opinion of the International Searching Authority for PCT/JP2016/077456 (PCT/ISA/237) dated Nov. 8, 2016.

* cited by examiner

LAP WELDING METHOD OF STEEL SHEET AND LAP WELD JOINT OF STEEL SHEET

TECHNICAL FIELD OF THE INVENTION

The present invention relates to a lap welding method of a steel sheet and a lap weld joint of a steel sheet.

The present application claims priority on the basis of Japanese Patent Application No. 2015-182846, filed on Sep. 16, 2015 in Japan, the content of which is incorporated herein by reference.

RELATED ART

Recently, in the automotive field, there have been a demand for the weight reduction of vehicle bodies in order for gas mileage improvement and the reduction of $CO_2$ emission and a demand for the strengthening of vehicle body members in order for collision safety improvement. In addition, in order to meet such demands, high-strength steel sheets are used for vehicle body members, a variety of components, and the like.

In steps for manufacturing vehicle body members made of high-strength steel sheets and steps for attaching components made of high-strength steel sheets, mainly, resistance spot welding (hereinafter, also simply referred to as spot welding) is broadly used. For example, as basic structural members constituting vehicle bodies, lap weld joints of steel sheets are used, and these lap weld joints are manufactured by overlapping two steel sheet members having a hat shape and spot-welding the overlapping portions. FIG. 16A is a horizontal cross-sectional view showing a lap weld joint 60 of a steel sheet of the related art and is a view for describing a lap welding method of a steel sheet of the related art. In addition, FIG. 16B is a partial enlarged view of FIG. 16A. Meanwhile, in FIG. 16B, one of a pair of welding electrodes 90 is not shown.

As shown in FIG. 16A, in the lap welding method of the related art, two steel sheet members 70 which respectively have a pair of flange portions 72 and a pair of standing wall portion 74 that stands from these flange portions 72 and have a hat-like cross-sectional shape are overlapped with each other, and then the flange portions 72 of these pair of steel sheet members 70 are interposed between the pair of welding electrodes 90 and are spot-welded, thereby forming solidified portions 80 (hereinafter, referred to as "nuggets") between the flange portions 72.

As shown in FIG. 16A and FIG. 16B, the welding electrode 90 that is used for the spot welding has a cylindrical main body portion 92 and a taper portion 94 that tapers toward a tip end. Meanwhile, the diameter $\phi$ of the main body portion 92 is, for example, 16 mm, and the diameter $\phi'$ of a tip end surface 94a of the taper portion is, for example, 6 mm. In addition, the width w of the flange portion 72 of the steel sheet member 70 is, for example, 15 to 20 mm. In addition, the tip end surface 94a of the taper portion 94 comes into contact with the flange portion 72 of the steel sheet member 70, whereby electric currents flow in the flange portion 72, and the nugget 80 is formed. That is, the diameter $\phi'$ of a tip end surface 94a of the welding electrode 90 determines an electric conduction diameter and almost coincides with the maximum nugget diameter to be obtained.

In a case in which two steel sheet members 70 are spot-welded using the welding electrodes 90, when the standing wall portion 74 of the steel sheet member 70 and the welding electrode 90 come into contact with each other, the standing wall portion 74 and the welding electrode 90 are electrically conducted to each other, and there is a concern that it may not be possible to weld the flange portions 72 of the steel sheet members 70. Therefore, during the spot welding of the steel sheet members 70, it is necessary to provide a gap for avoiding interference between the standing wall portion 74 and the welding electrode 90. Furthermore, as described above, the welding electrode 90 has the taper portion 94 that tapers toward the tip end. Therefore, the nugget 80 is formed at a location a predetermined distance away from the standing wall portion 74.

In the lap weld joint 60 obtained by the lap welding method of the related art, the nuggets 80 are formed at locations away from the standing wall portion 74 as described above, and thus, in a case in which a tensile stress acts thereon, the flange portions 72 of the two steel sheet members 70 easily deform in a direction in which the flange portions move away from each other (that is, torn-open deformation), consequently, stress focuses on an end portion of the nugget 80, and the joint strength decreases. In addition, even in a case in which a torsional moment acts on the surrounding of a central axis line CL of the lap weld joint 60, torn-open deformation is easily caused, and the torsional stiffness decreases.

Here, Patent Document 1 discloses a technique in which a quenching treatment is carried out on a portion 2 to 5 mm wide from the outer circumferential end of a nugget in order to increase the tensile shear strength of a spot welded joint. In addition, Patent Document 2 discloses a technique in which, when a weld bead is formed by laser-welding flanges of two steel sheet members, a to-be-welded location at which the formation of the weld bead is expected is tacked by means of spot welding or the like.

PRIOR ART DOCUMENT

Patent Documents

[Patent Document 1] Japanese Unexamined Patent Application, First Publication No. 2013-223872
[Patent Document 2] Japanese Unexamined Patent Application, First Publication No. 2008-178905

DISCLOSURE OF THE INVENTION

Problems to be Solved by the Invention

However, in Patent Document 1, the hardness in the vicinity of a nugget end portion is increased by quenching the portion 2 to 5 mm wide from the outer circumferential end of the nugget, and thus, in a lap weld joint that is obtained by spot-welding the overlapping portions of a flange portion of a hat-shaped steel sheet member and another steel sheet member, it is difficult to suppress the torn-open deformation. Therefore, in the technique of Patent Document 1, it is difficult to improve the joint strength and torsional stiffness of the lap weld joint.

In addition, in Patent Document 2, on a plurality of tacked places formed along the longitudinal direction of the flange, a weld bead is formed by laser welding. Therefore, in Patent Document 2, similar to Patent Document 1, it is difficult to suppress the torn-open deformation.

The present invention has been made in consideration of the above-described circumstance, and an object of the present invention is to provide a lap welding method of a steel sheet and a lap weld joint of a steel sheet which are capable of improving joint strength and torsional stiffness in lap weld joints that are obtained by welding a steel sheet member having flange portions and standing wall portions to another steel sheet member.

Means for Solving the Problem

In order to achieve the above-described object, the present invention employs the followings.

(1) According to an aspect of the present invention, there is provided a lap welding method of a steel sheet for overlapping and welding a first steel sheet member and a second steel sheet member having a flange portion that is overlapped with the first steel sheet member and a standing wall portion that stands from the flange portion, the method including: spot welding in a state in which the flange portion is overlapped with the first steel sheet member, thereby forming a nugget between the first steel sheet member and the flange portion; and, after the spot welding, laser welding a region between an R stop of the standing wall portion and the nugget, thereby forming a weld bead, in which, in the weld bead, a dimension in a longitudinal direction of the flange portion is equal to or longer than a diameter of the nugget, and a width dimension is 0.5 to 3.0 mm.

(2) In the aspect according to (1), when a shortest distance between the R stop of the standing wall portion and the nugget is represented by D1 (mm) and a shortest distance between the R stop of the standing wall portion and the weld bead is represented by D2 (mm), a ratio D2/D1 of D2 to D1 may be ½ or less.

(3) In the aspect according to (1) or (2), in the laser welding, the weld bead may be formed so that an end portion of the weld bead in a width direction is formed in the R stop of the standing wall portion.

(4) In the aspect according to any one of (1) to (3), a shape of the weld bead may be a linear shape, a U shape, or a wavy shape.

(5) According to another aspect of the present invention, there is provided a lap weld joint of a steel sheet including: a first steel sheet member; a second steel sheet member having a flange portion that is overlapped with the first steel sheet member and a standing wall portion that stands from the flange portion; a nugget that joins the first steel sheet member and the flange portion; and a weld bead that joins the first steel sheet member and the flange portion and is formed in a region between an R stop of the standing wall portion and the nugget, in which, in the weld bead, a dimension in a longitudinal direction of the flange portion is equal to or longer than a diameter of the nugget, and a width dimension is 0.5 to 3.0 mm.

(6) In the aspect according to (5), when a shortest distance between the R stop of the standing wall portion and the nugget is represented by D1 (mm) and a shortest distance between the R stop of the standing wall portion and the weld bead is represented by D2 (mm), a ratio D2/D1 of D2 to D1 may be ½ or less.

(7) In the aspect according to (5) or (6), an end portion of the weld bead in a width direction may be formed in the R stop of the standing wall portion.

(8) In the aspect according to any one of (5) to (7), the weld bead may have a linear, U-like, or wavy shape.

Effects of the Invention

According to the respective aspects of the present invention, it is possible to improve joint strength and torsional stiffness in lap weld joints that are obtained by welding a steel sheet member having flange portions and standing wall portions to another steel sheet member.

EMBODIMENTS OF THE INVENTION

Hereinafter, individual embodiments of the present invention will be described in detail with reference to the drawings. Meanwhile, in the present specification and the drawings, constituent elements having substantially the same functional constitution will be given the same reference symbol and will not be described again.

First Embodiment

Figure 2:
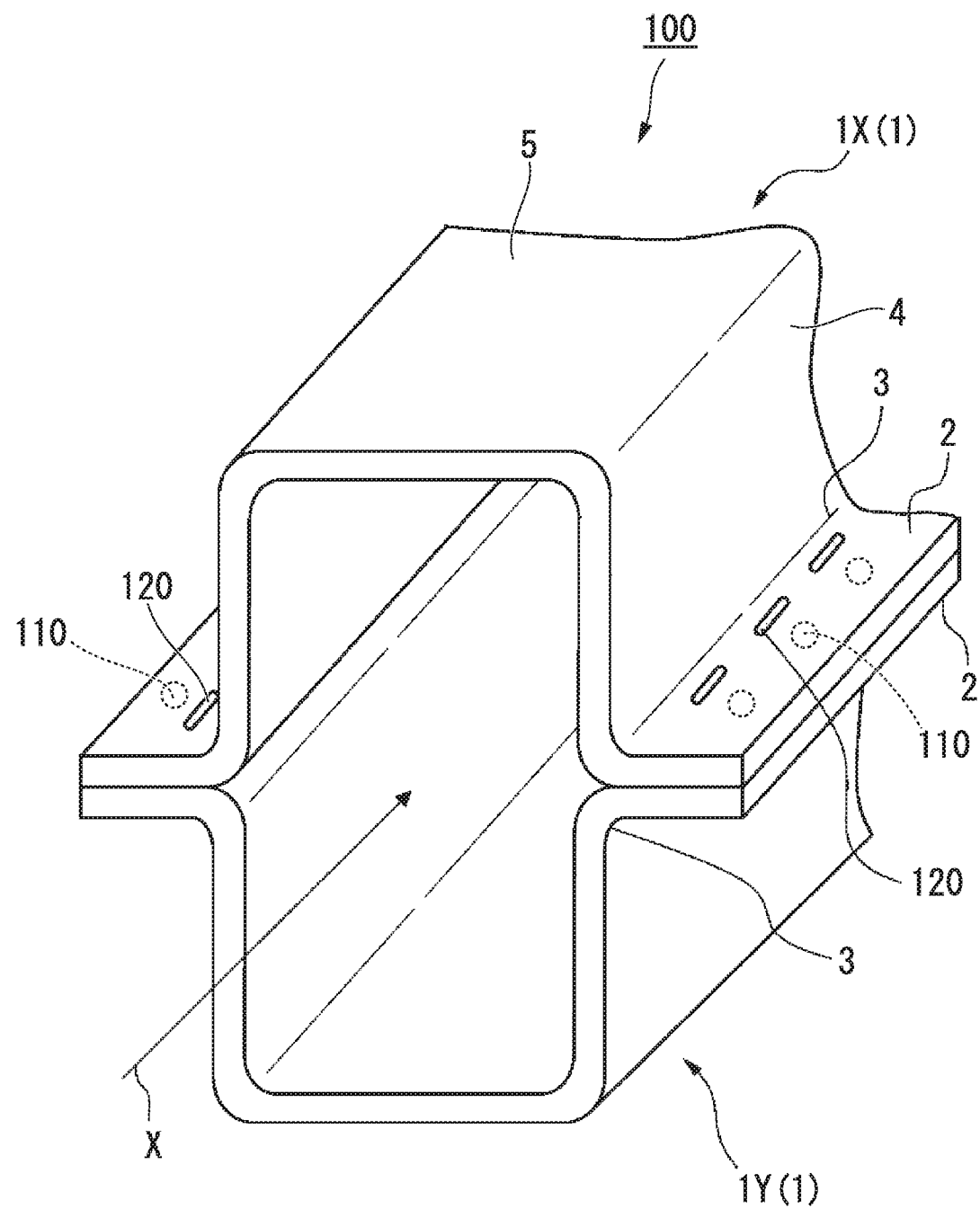
FIG. 2 is a perspective view showing a lap weld joint of a steel sheet according to a first embodiment of the present invention.

FIG. 2 is a perspective view showing a lap weld joint 100 of a steel sheet according to a first embodiment of the present invention (hereinafter, also simply referred to as the lap weld joint 100). The lap weld joint 100 is obtained by spot-welding and laser-welding a pair of steel sheet members 1. In the following description, first, the steel sheet member 1 will be described.

Figure 1:
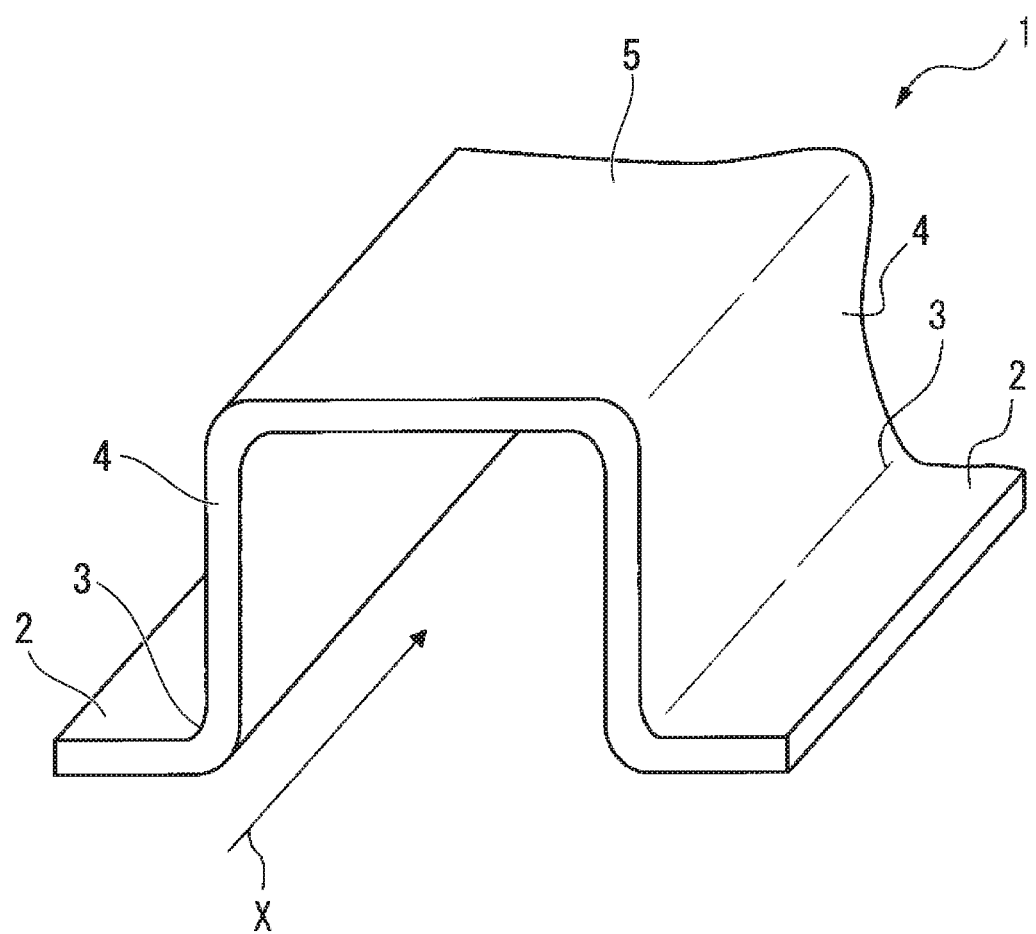
FIG. 1 is a perspective view showing a hat-shaped steel sheet member.

FIG. 1 is a perspective view showing the steel sheet member 1 in the lap weld joint 100. As shown in FIG. 1, the steel sheet member 1 includes a pair of flange portions 2 that is long in a direction, has a hat-shaped cross section that is perpendicular to a longitudinal direction, and is parallel to each other, a pair of standing wall portions 4 that substantially perpendicularly stands from the pair of flange portions 2, and a transverse wall portion 5 that connects the pair of standing wall portions 4 and is parallel to the flange portions 2. The steel sheet member 1 is manufactured by, for example, bending a steel sheet by means of press forming. That is, in the steel sheet member 1, the flange portion 2 and the standing wall portion 4 are continuous with each other, the standing wall portion 4 and the transverse wall portion 5 are continuous with each other, and, particularly, there are no holes or the like formed on surfaces of the flange portions 2, and thus it is possible to prevent a decrease in strength.

Meanwhile, in FIG. 1, reference symbol X indicates a central axis line of the steel sheet member 1. In addition, the direction of the central axis line X coincides with the longitudinal direction of the steel sheet member 1.

The standing wall portion 4 of the steel sheet member 1 has an R portion 3 that is connected to the flange portion 2 of the steel sheet member 1 and has a predetermined curvature radius. The curvature radius of the R portion 3 is, for example, 3 to 6 mm.

The sheet thickness of the steel sheet member 1 is, for example, 0.5 to 3.2 mm. In addition, the width (the length of the flange portion 2 perpendicular to a sheet thickness direction and the longitudinal direction) of the flange portion 2 of the steel sheet member 1 is, for example, 10 to 20 mm.

The component composition of the steel sheet member 1 is not particularly limited and may be appropriately set so that mechanical characteristics suitable for uses can be obtained. Meanwhile, in a case in which the steel sheet member 1 contains 0.10% by mass or more of carbon, the tensile strength significantly improves. Therefore, the content of carbon in the steel sheet member 1 is preferably 0.10% by mass or more.

In addition, the steel sheet member 1 may have a surface-treated film(s) formed on both surfaces or on a single surface. The surface-treated film is, for example, a plated film, a coated film, or the like. Examples of the plated film include a zinc plate, an aluminum plate, a zinc/nickel plate, a zinc/iron plate, a zinc/aluminum/magnesium plate, and the like, and examples of a method for manufacturing plates include hot-dip plating, electroplating, and the like.

Figure 3:
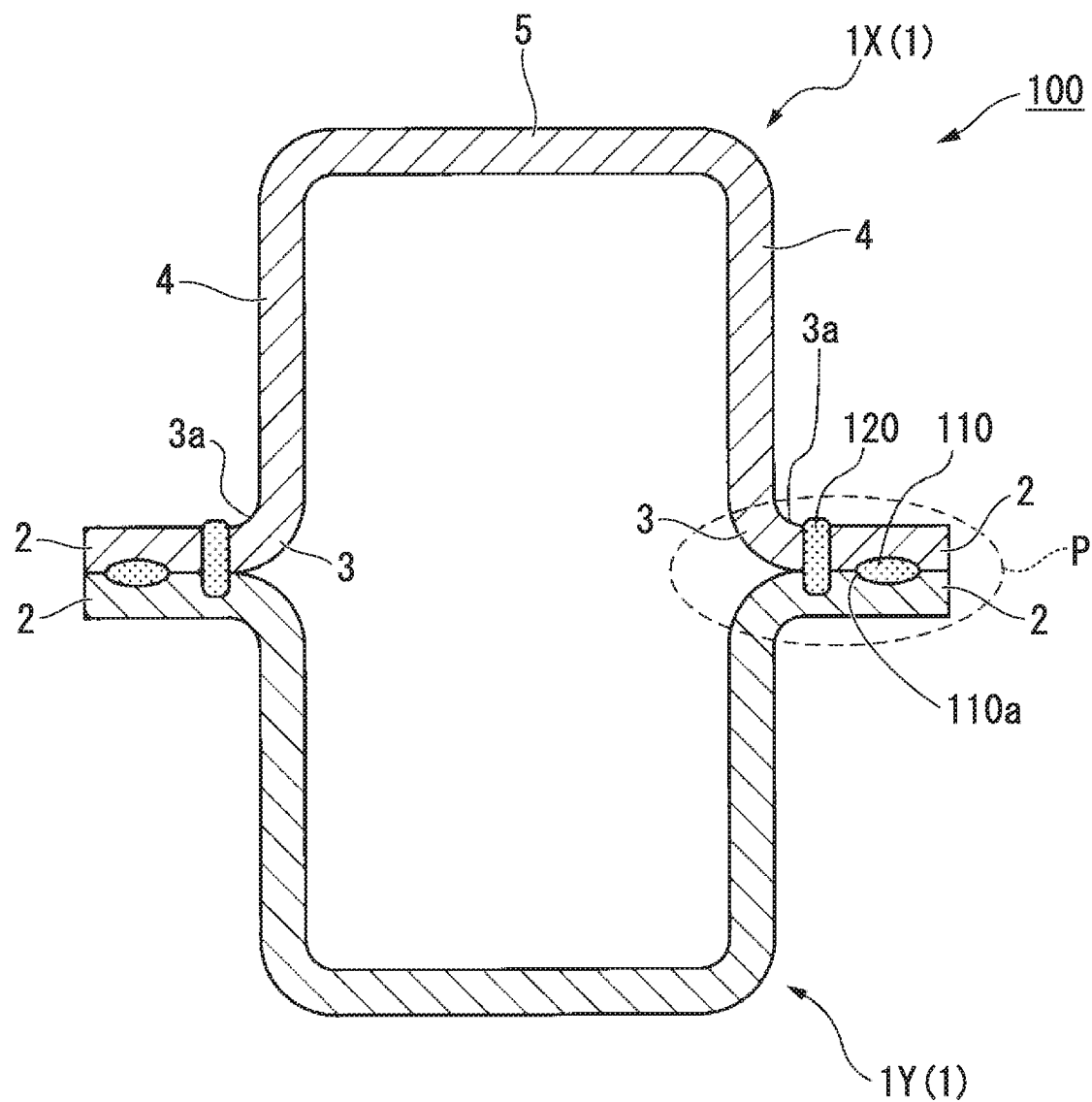
FIG. 3 is a view showing the lap weld joint and is a cross-sectional view of a cross section that is perpendicular to a longitudinal direction and includes an end portion 110a of a nugget 110.

Next, the lap weld joint 100 according to the present embodiment will be described. FIG. 2 is a perspective view of the lap weld joint 100, and FIG. 3 is a cross-sectional view of a cross section that is perpendicular to the longitudinal direction of the lap weld joint 100 and includes an end portion 110a of a nugget 110. As shown in FIG. 2 and FIG. 3, the lap weld joint 100 is long in the direction of the central axis line X and has a hollow cross section that is perpendicular to the central axis line X (longitudinal direction). In addition, the lap weld joint 100 includes a pair of steel sheet members 1 facing each other, a plurality of nuggets 110 that are formed by spot-welding flange portions 2 of the pair of steel sheet members 1, and a plurality of weld beads 120 that are formed by laser-welding the flange portions 2 of the pair of the steel sheet members 1. Meanwhile, in FIG. 2 and FIG. 3, reference symbol 1X indicates the steel sheet member 1 disposed on the upper side, and reference symbol 1Y indicates the steel sheet member 1 disposed on the lower side.

Figure 4A:
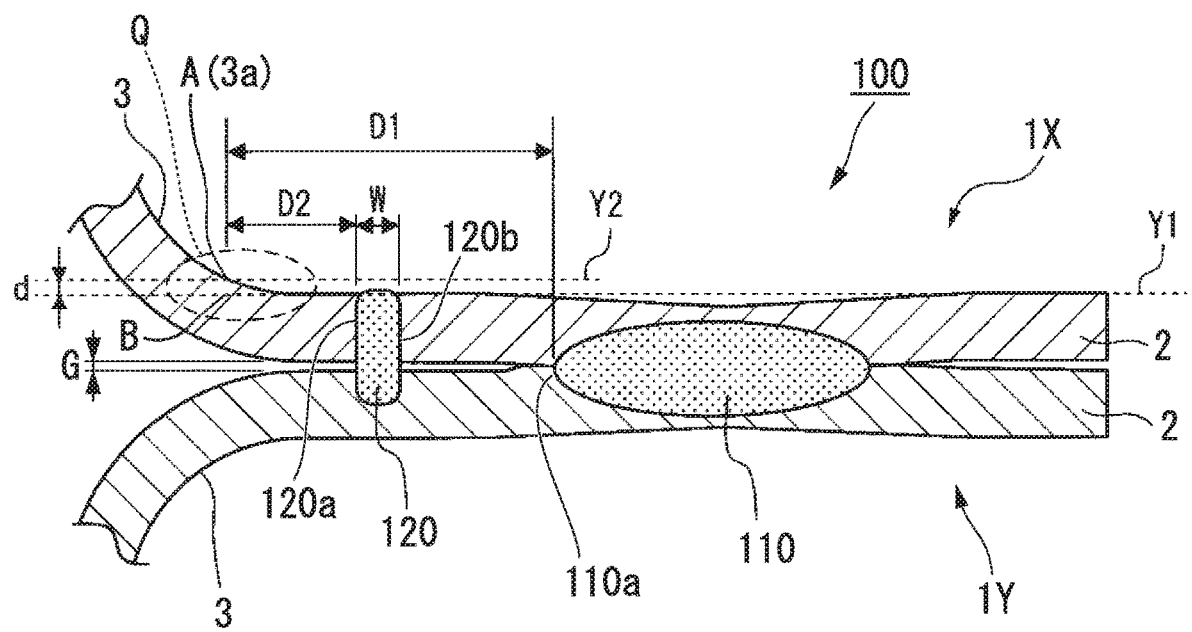
FIG. 4A is an enlarged view of a portion indicated by reference symbol P in FIG. 3.

FIG. 4A is an enlarged view of a portion indicated by reference symbol P in FIG. 3. As shown in FIG. 3 and FIG. 4A, the nugget 110 is formed between the flange portions 2 by spot-welding the flange portion 2 of the steel sheet member 1X and the flange portion 2 of the steel sheet member 1Y and joins the flange portion 2 of the steel sheet member 1X and the flange portion 2 of the steel sheet member 1Y. In other words, the nugget 110 is formed on an overlapping surface of the flange portion 2 of the steel sheet member 1X and the flange portion 2 of the steel sheet member 1Y.

The weld bead 120 is formed between the flange portions 2 by welding the flange portion 2 of the steel sheet member 1X and the flange portion 2 of the steel sheet member 1Y by radiating laser beams from the upper side of the flange portion 2 of the steel sheet member 1X, and joins the flange portions 2 to each other. In other words, the weld bead 120 is formed from an external surface (among two surfaces in the sheet thickness direction, a surface facing the outside) of the flange portion 2 of the steel sheet member 1X to an inside of the flange portion 2 of the steel sheet member 1Y. Meanwhile, the weld bead 120 may or may not penetrate the external surface of the flange portion 2 of the steel sheet member 1X and an external surface of the flange portion 2 of the steel sheet member 1Y.

In addition, the weld bead 120 is formed in a region between an R stop 3a of the R portion 3 of the steel sheet member 1X and the nugget 110 as shown in FIG. 4A. Specifically, an end portion 120a of the weld bead 120 on the inside of the flange portion 2 in the width direction (an end portion of the weld bead 120 in the width direction which is closest to the R stop 3a) is located on the outside of the R stop 3a in the width direction in the flange portion 2. In addition, an end portion 120b of the weld bead 120 on the outside of the flange portion 2 in the width direction (an end portion of the weld bead 120 in the width direction which is farthest from the R stop 3a) is located on the inside of an end portion 110a of the nugget 110 on the inside of the flange portion 2 in the width direction (an end portion of the nugget 110 which is closest to the R stop 3a) in the width direction in the flange portion 2. Meanwhile, the end portion 120a of the weld bead 120 may be located on the inside of the end portion 110a of the nugget 110 in the width direction in the flange portion 2, and the end portion 120b of the weld bead 120 may be located on the outside of the end portion 110a of the nugget 110 in the width direction in the flange portion 2. That is, a part of the weld bead 120 may be formed on the nugget 110.

Figure 4B:
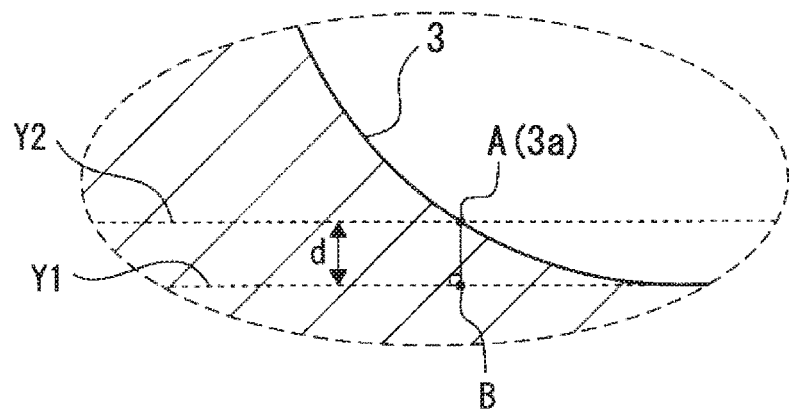
FIG. 4B is an enlarged view of a portion indicated by reference symbol Q in FIG. 4A.

Here, the R stop 3a will be described using FIG. 4A and FIG. 4B. Meanwhile, FIG. 4B is an enlarged view of a portion indicated by reference symbol Q in FIG. 4A. As shown in FIG. 4A and FIG. 4B, the R stop 3a is a transition place from the R portion 3 to the flange portion 2. Specifically, on a surface of the flange portion 2, a straight line Y1 is drawn from an end portion of the flange portion 2 toward the inside of the steel sheet member 1X in the width direction, and furthermore, a perpendicular line is drawn from an arbitrary point A on the R portion 3 of the steel sheet member 1X so as to intersect the straight line Y1. In addition, the point A on the R portion 3 at which a distance d between an intersection point B between the straight line Y1 and the perpendicular line and the point A reaches 0.1 mm is considered as the R stop 3a.

As described above, the weld bead 120 is formed between the R stop 3a and the nugget 110, and thus a distance D1 (mm) between the R stop 3a and the nugget 110 becomes greater than a distance D2 (mm) between the R stop 3a and the weld bead 120. Meanwhile, the distance D1 refers to a distance between an intersection point between a perpendicular line drawn from the end portion 110a of the nugget 110 so as to intersect the straight line Y2 and the straight line Y2 and the R stop 3a. That is, the distance D1 is the shortest distance between the R stop 3a and the nugget 110.

In addition, the distance D2 refers to a distance between an intersection point between a perpendicular line drawn from the end portion 120a of the weld bead 120 so as to intersect the straight line Y2 and the straight line Y2 and the R stop 3a. That is, the distance D2 is the shortest distance between the R stop 3a and the weld bead 120.

In addition, as described above, in the lap weld joint 100, the end portion 120a of the weld bead 120 is located on the outside of the R stop 3a in the width direction in the flange portion 2, and the end portion 120b of the weld bead 120 is located on the inside of the end portion 110a of the nugget 110 in the width direction in the flange portion 2, and thus the distance D1 is greater than the distance D2 (D1>D2) and is greater than the sum of the distance D2 and a width W (mm) of the weld bead 120 (D1>D2+W). Meanwhile, in a case in which the end portion 120a of the weld bead 120 is located on the outside of the R stop 3a in the width direction in the flange portion 2, and the end portion 120b of the weld bead 120 is located on the outside of the end portion 110a of the nugget 110 in the width direction in the flange portion 2, the distance D1 is greater than the distance D2 (D1>D2) and is less than the sum of the distance D2 and the width W of the weld bead 120 (D1<D2+W).

Figure 5:
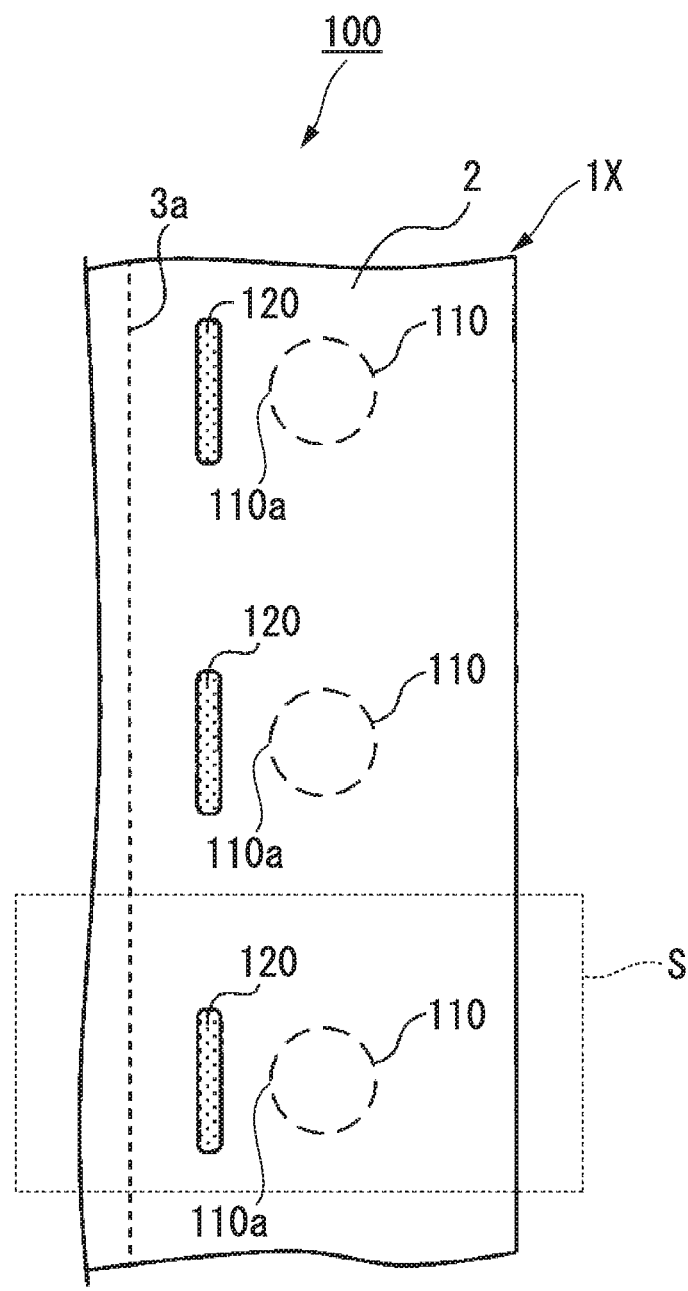
FIG. 5 is a partial enlarged plan view of the lap weld joint.
Figure 6:
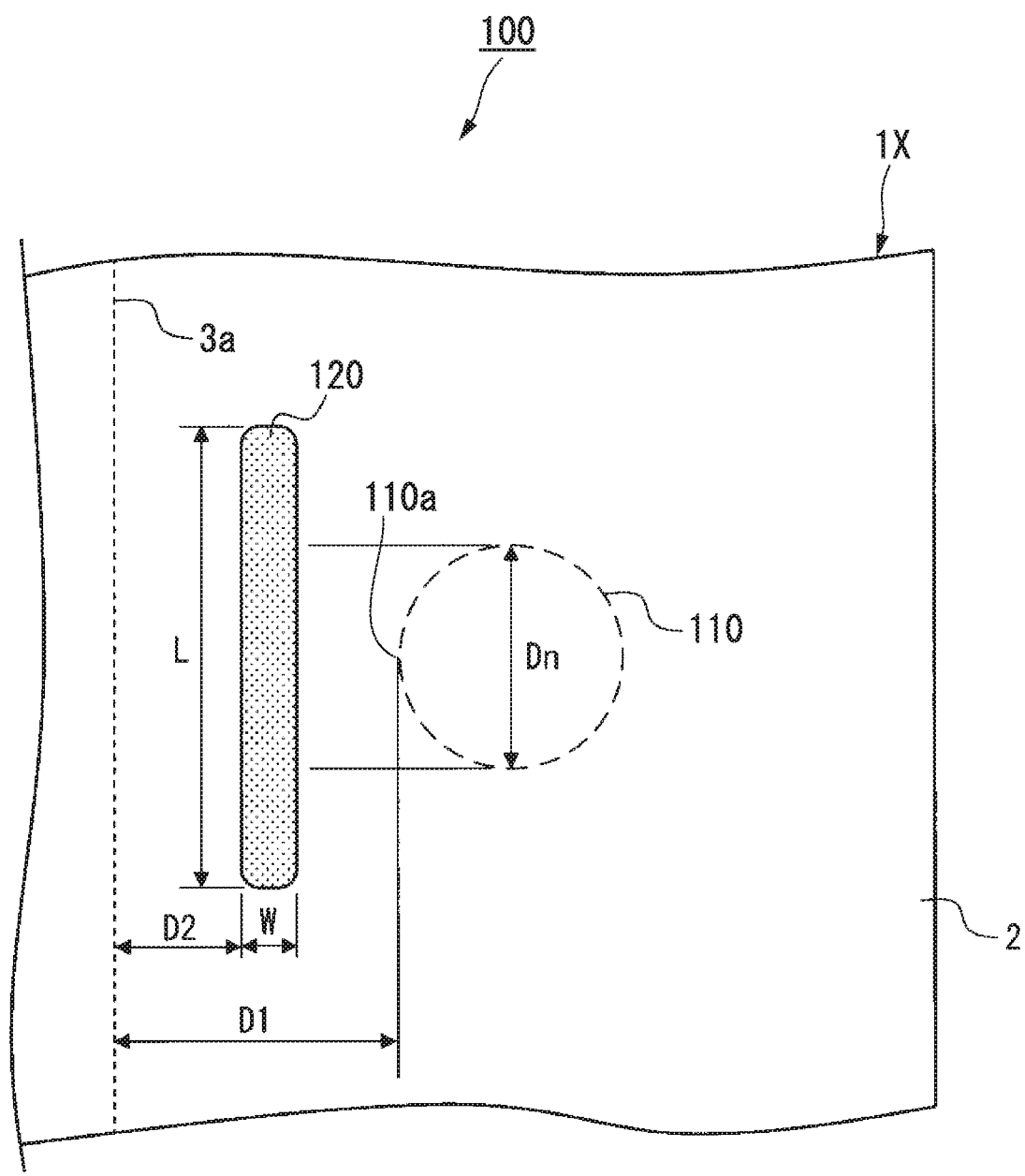
FIG. 6 is an enlarged view of a portion indicated by reference symbol S in FIG. 5.

FIG. 5 is a plan view of the lap weld joint 100 and is a partial enlarged view of the flange portion 2 of the steel sheet member 1X. In addition, FIG. 6 is an enlarged view of a portion indicated by reference symbol S in FIG. 5. As shown in FIG. 5 (that is, in a case in which the flange portion 2 of the steel sheet member 1X is seen in a plan view), a plurality of nuggets 110 and a plurality of weld beads 120 are respectively formed in series along the longitudinal direction of the flange portion 2 of the steel sheet member 1X. In addition, the plurality of weld beads 120 is located on the inside of the plurality of nuggets 110 in the width direction in the flange portion 2, and faces the plurality of nuggets 110 in the width direction of the flange portion 2.

As shown in FIG. 6, in a plan view, the nugget 110 has, for example, a circular shape, an elliptical shape, an oval shape, or the like, and a diameter Dn thereof is, for example, $3\sqrt{t}$ to $5\sqrt{t}$ (mm). Meanwhile, the diameter Dn of the nugget 110 refers to the length of the nugget 110 in the longitudinal direction of the flange portion 2. In addition, the t (mm) represents a thinner sheet thickness between the sheet thickness of the flange portion 2 of the steel sheet member 1X and the sheet thickness of the flange portion 2 of the steel sheet member 1Y.

The weld bead 120 has a linear shape that extends along the longitudinal direction of the flange portion 2 of the steel sheet member 1X, and a length L (mm) (the length in the longitudinal direction of the flange portion 2) is equal to or greater than the diameter Dn of the nugget 110. That is, the weld bead 120 is formed astride both end portions of the nugget 110 in the longitudinal direction of the flange portion 2. Meanwhile, the length L of the weld bead 120 represents the total length of the weld bead 120. In addition, the width W (the length in the width direction of the flange portion 2) of the weld bead 120 is 0.5 to 3.0 mm.

The upper limit of the length L of the weld bead 120 is not particularly limited. But, from the viewpoint of joint strength and torsional stiffness, the upper limit of the length L is preferably greater.

In addition, the width W of the weld bead 120 is preferably 0.8 to 1.5 mm, in consideration of the efficiency of an operation for forming the weld beads.

According to the lap weld joint 100 according to the present embodiment described above, the weld bead 120 having the length L that is equal to or greater than the diameter Dn of the nugget 110 is formed in the region between the nugget 110 and the R stop 3a of the R portion 3 of the standing wall portion 4, and thus it is possible to suppress torn-open deformation in the circumference of the nugget 110 against torsional moments around the central axis line X and tensile stress. In addition, the width W of the weld bead 120 is set to 0.5 to 3.0 mm, and thus it is possible to impart a sufficient strength for suppressing the torn-open deformation of the flange portion 2 to the weld bead 120. Therefore, it is possible to improve torsional stiffness and joint strength.

Meanwhile, regarding the distance D1 and the distance D2 shown in FIG. 4A and FIG. 6, a ratio D2/D1 of the distance D2 to the distance D1 is preferably ½ or less. In this case, the weld bead 120 comes close to the R stop 3a, and thus the torn-open deformation of the circumference of the nugget 110 is further suppressed, and torsional stiffness and joint strength can be further improved. In addition, from the above-described viewpoint, the end portion of the weld bead 120 on the inside in the width direction is more preferably formed at the R stop 3a (that is, D2=0 (mm)). In this case, it is possible to further improve torsional stiffness and joint strength.

Next, a lap welding method of a steel sheet according to the present embodiment will be described. The lap welding method of a steel sheet according to the present embodiment is a method for obtaining the lap weld joint 100 using the steel sheet members 1X and 1Y. First, as shown in FIG. 2 and FIG. 3, the flange portion 2 of the steel sheet member 1X and the flange portion 2 of the steel sheet member 1Y are overlapped with each other so that the steel sheet members 1X and 1Y face each other.

Subsequently, the flange portion 2 of the steel sheet member 1X and the flange portion 2 of the steel sheet member 1Y are spot-welded in a state in which the flange portion 2 of the steel sheet member 1X and the flange portion 2 of the steel sheet member 1Y are overlapped with each other, thereby forming the plurality of nuggets 110 along the longitudinal direction of the flange portion 2. At this time, the conditions of the spot welding and the like are not particularly limited, and, for example, it is possible to use a DR-type electrode having a diameter of approximately 16 mm and set the welding pressure to 300 to 500 kgf, the electric conduction time to 0.2 to 0.4 s, and the electric conduction current to 5 to 10 kA. In addition, currents may be any of direct currents and alternating currents, and the current waveform may be any of single-phase current and multi-phase current.

In addition, regarding the diameter Dn of the nugget 110, by evaluating the relationship between welding conditions and nugget diameters Dn to be obtained in advance using coupons (test pieces), it is possible to form the nuggets 110 having a desired diameter in the steel sheet members 1X and 1Y Meanwhile, the diameter Dn of the nugget 110 can be evaluated by observing a cross section in the sheet thickness direction which includes the nugget 110.

After the flange portion 2 of the steel sheet member 1X and the flange portion 2 of the steel sheet member 1Y are spot-welded together, these flange portions 2 are laser-welded, thereby forming the plurality of weld beads 120 having the length L that is equal to or greater than the diameter Dn of the nugget 110 and the width W that is 0.5 to 3.0 mm along the longitudinal direction of the flange portion 2 in the region between the R stop 3a of the R portion 3 of the steel sheet member 1X and the nuggets 110.

At this time, the conditions of the laser welding and the like are not particularly limited, but a remote laser welding apparatus is preferably used. This is because the remote laser welding apparatus moves the laser beam at a high speed among welding points using a galvanometer mirror attached to the tip end of a robot arm and thus it is possible to significantly shorten the operation time of welding. In addition, as a laser oscillator, for example, a laser such as a $CO_2$ laser, a YAG laser, a fiber laser, a DISK laser, or a semiconductor laser can be used. In addition, the laser welding can be carried out under conditions of a laser output of 2 to 10 kW, a beam diameter on a light focus surface of 0.3 to 3.0 mm, and a welding rate of 0.1 to 20 m/min.

In a case in which the steel sheet members 1X and 1Y are spot-welded together as described above, due to the restrictions of the spot welding (restrictions such as a necessity of avoiding the contact between welding electrodes and the standing wall portions 4 of the steel sheet members 1X and 1Y), it is necessary to form the nuggets 110 at locations a predetermined distance away from the R stop 3a. In contrast, in the laser welding, there are no restrictions as described above, and it is possible to weld the flange portion 2 of the steel sheet member 1X and the flange portion 2 of the steel sheet member 1Y at locations close to the R stop 3a. That is, since the flange portion 2 of the steel sheet member 1X and the flange portion 2 of the steel sheet member 1Y are welded together by means of laser welding, it is possible to form the weld beads 120 between the R stop 3a of the R portion 3 of the standing wall portion 4 and the nuggets 110.

In addition, as described above, when the steel sheet members 1X and 1Y are welded together, first, spot welding is carried out. Additionally, as shown in FIG. 4A, in a state after spot welding and before laser welding, an uplift phenomenon attributed to the plastic flow of the steel sheet members 1X and 1Y (hereinafter, referred to as "sheet separation phenomenon") occurs in the circumference of the welding portion of the flange portion 2 of the steel sheet member 1X and the flange portion 2 of the steel sheet member 1Y, and, due to this sheet separation phenomenon, for example, a gap G of 0.05 to 0.4 mm is generated between the flange portion 2 of the steel sheet member 1X and the flange portion 2 of the steel sheet member 1Y. This gap G is relatively uniformly formed and thus contributes to the stabilization of welding conditions during the laser welding.

That is, in a case in which the steel sheet members 1X and 1Y on which galvanizing has been carried out are laser-welded together, there are cases in which zinc vapor generated by heating with laser beams causes the scattering (sputtering) of molten steel. However, even in a case in which the steel sheet members 1X and 1Y on which galvanizing has been carried out are used, during the laser welding, the gap G of approximately 0.05 to 0.4 mm is formed due to the sheet separation phenomenon, and thus the zinc vapor is discharged through the gap and it is possible to suppress the scattering (sputtering) of molten steel.

Meanwhile, in the vicinity of the nuggets 110, the gap G is ensured due to the sheet separation phenomenon; however, in places away from the nuggets 110, there are cases in which the flange portions 2 of the steel sheet members 1X and 1Y come into contact with each other or the gap G becomes small. Therefore, when the distance between the weld bead 120 and the nugget 110 is adjusted so as to be approximately 4 to 5 mm, it is possible to suppress scattering, which is preferable. In other words, in FIG. 4A, the distance D1 is preferably approximately 4 to 5 mm greater than the sum of the distance D2 and the width W.

As described above, according to the lap welding method of a steel sheet according to the present embodiment, the steel sheet members 1X and 1Y are spot-welded together and then laser-welded, and thus it is possible to form the weld beads 120 between the nuggets 110 and the R stop 3a. In addition, the steel sheet members 1X and 1Y are spot-welded together and then laser-welded, and thus, even in a case in which the steel sheet members 1X and 1Y on which galvanizing has been carried out are welded together, it is possible to suppress the scattering (sputtering) of molten steel due to the sheet separation phenomenon.

Modification Example of First Embodiment

Figure 7:
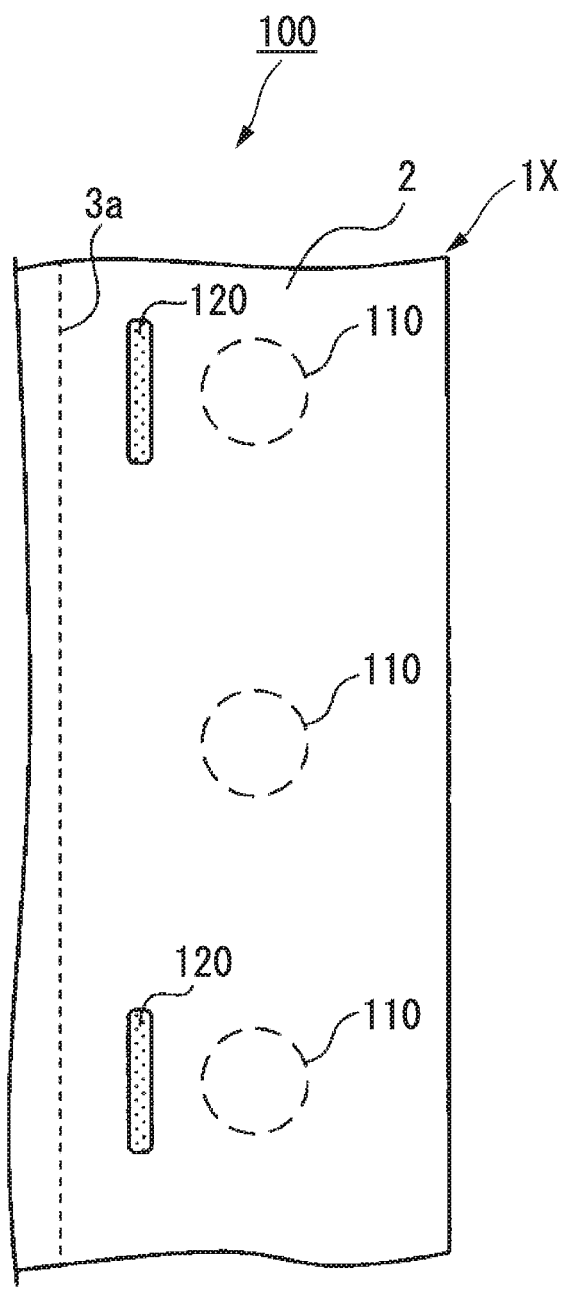
FIG. 7 is a partial enlarged plan view showing a first modification example of the lap weld joint.

In the present embodiment, a case in which the plurality of weld beads 120 is formed so as to face the plurality of nuggets 110 as shown in FIG. 5 has been described. However, as shown in FIG. 7, the weld beads 120 may be formed so as to face every other nugget 110. In other words, in a case in which the flange portion 2 is seen in a plan view, the nuggets 110 facing the weld bead 120, and the nuggets 110 not facing the weld bead 120 are alternately present in the longitudinal direction of the flange portion 2. In this case, the number of the weld beads 120 can be decreased, and thus it is possible to improve the efficiency of laser welding operation. Meanwhile, depending on the number of the nuggets 110, the weld beads 120 may be formed so as to face every two other nuggets 110.

Figure 8:
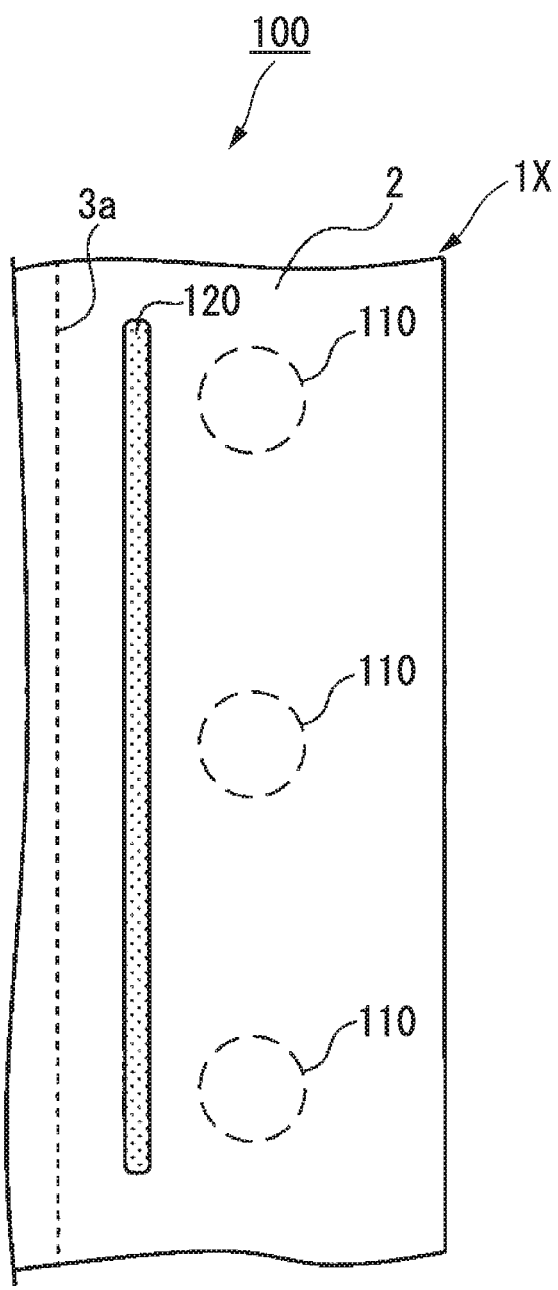
FIG. 8 is a partial enlarged plan view showing a second modification example of the lap weld joint.

In addition, as shown in FIG. 8, one weld bead 120 may be formed so as to face all of the nuggets 110. However, compared with the modification example shown in FIG. 8, the present embodiment (refer to FIG. 5) is capable of further decreasing the thermal deformation of the steel sheet members 1X and 1Y caused by welding since the total volume of the weld beads 120 becomes smaller. In addition, in the present embodiment (refer to FIG. 5), in the case of being seen in the longitudinal direction of the flange portion 2, the plurality of weld beads 120 is formed at intervals, and portions having a high strength and portions having a low strength are alternately present, and thus it is possible to improve impact safety in a case in which the lap weld joint 100 is applied to automotive bodies. Therefore, from the above-described viewpoints, the plurality of weld beads 120 preferably faces the plurality of nuggets 110 as in the present embodiment (refer to FIG. 5). Furthermore, as the number of the weld beads increases, the stiffness of the member tends to be saturated, and thus, even when the plurality of weld beads 120 is provided at intervals as in the present embodiment (refer to FIG. 5), it is possible to obtain an effect of both joint strength improvement and member stiffness improvement as long as the weld beads have a length that is equal to or longer than a certain value.

Figure 9:
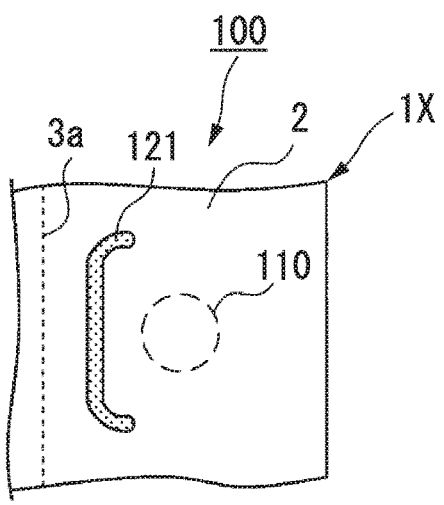
FIG. 9 is an enlarged view of the portion indicated by reference symbol S in FIG. 5 and is a view showing a third modification example of the lap weld joint.

In addition, in the present embodiment, a case in which linear weld beads 120 are formed as shown in FIG. 5 has been described. However, as shown in FIG. 9, a weld bead 121 having a U shape in a plan view may be formed. In this case, it is possible to further relax stress concentration in end portions in which welding begins and ends.

Figure 10:
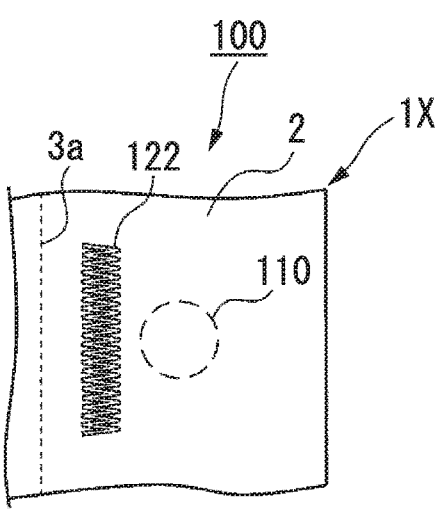
FIG. 10 is an enlarged view of the portion indicated by reference symbol S in FIG. 5 and is a view showing a fourth modification example of the lap weld joint.

In addition, as shown in FIG. 10, a weld bead 122 having a wavy shape in a plan view may be formed. In this case, it is possible to further increase the joint area, and thus it is possible to further improve joint strength.

Figure 11:
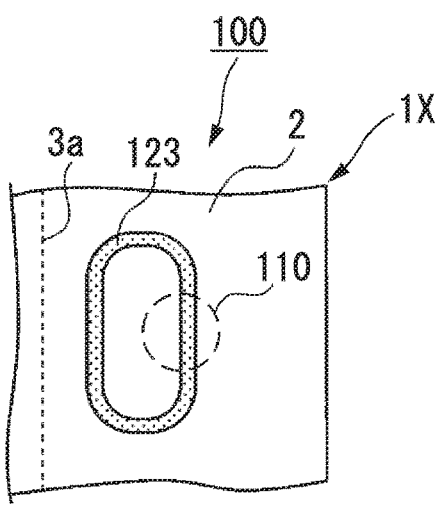
FIG. 11 is an enlarged view of the portion indicated by reference symbol S in FIG. 5 and is a view showing a fifth modification example of the lap weld joint.

In addition, as shown in FIG. 11, a weld bead 123 having an elliptical shape in a plan view may be formed. In this case, similar to the modification example of FIG. 9, it is possible to further relax stress concentration in end portions in which welding begins and ends.

Figure 12:
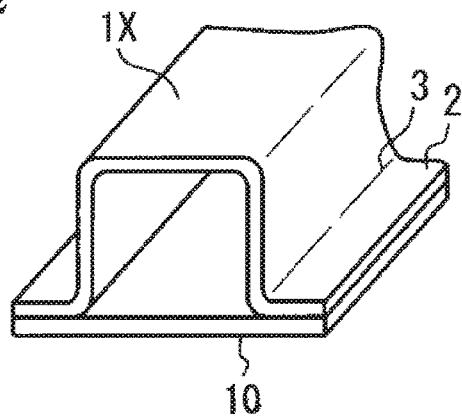
FIG. 12 is a perspective view showing a sixth modification example of the lap weld joint.

In addition, in the present embodiment, a case in which the steel sheet member 1X and the steel sheet member 1Y which have a hat-shaped cross section as shown in FIG. 2 and FIG. 3 are welded together has been described. However, as shown in FIG. 12, the steel sheet member 1X and a planar steel sheet 10 may be welded together.

Figure 13:
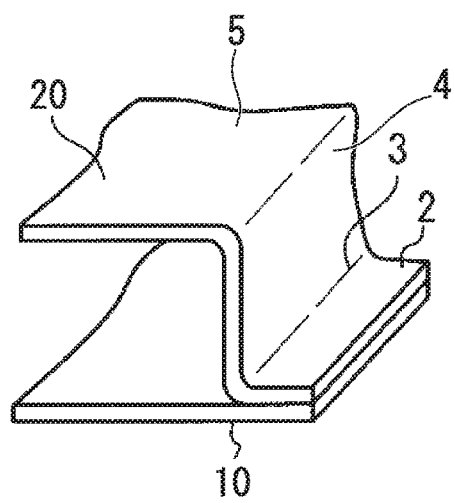
FIG. 13 is a perspective view showing a seventh modification example of the lap weld joint.

In addition, as shown in FIG. 13, a steel sheet member 20 having one flange portion 2, one standing wall portion 4, and one transverse wall portion 5 parallel to the flange portion 2 may be welded to the steel sheet 10.

Figure 14:
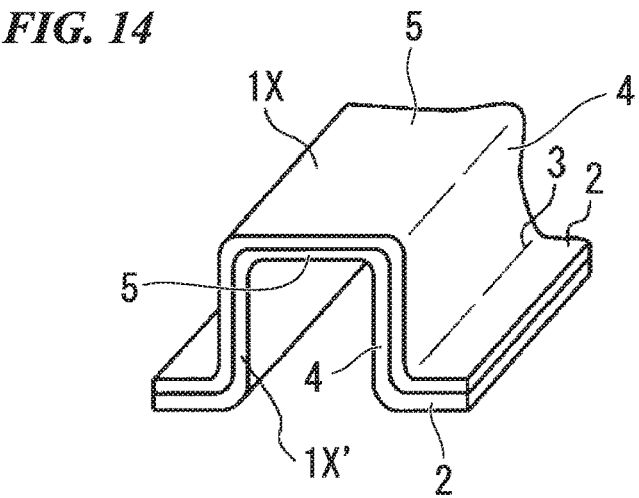
FIG. 14 is a perspective view showing an eighth modification example of the lap weld joint.

In addition, as shown in FIG. 14, the steel sheet member 1X and a steel sheet member 1X' having a size different from that of the steel sheet member 1X may be welded together so that the flange portions 2, the standing wall portions 4, and the transverse wall portions 5 thereof overlap each other.

Second Embodiment

Next, a lap weld joint 200 according to a second embodiment of the present invention will be described.

Figure 15:
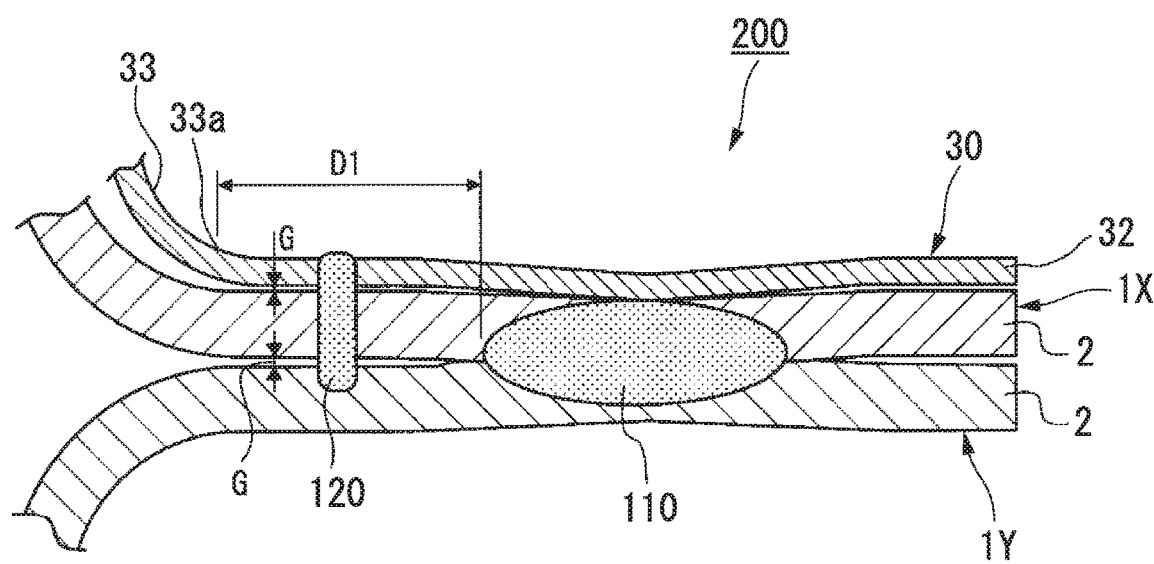
FIG. 15 is a partial cross-sectional view showing a lap weld joint of a steel sheet according to a second embodiment of the present invention.
Figure 16A:
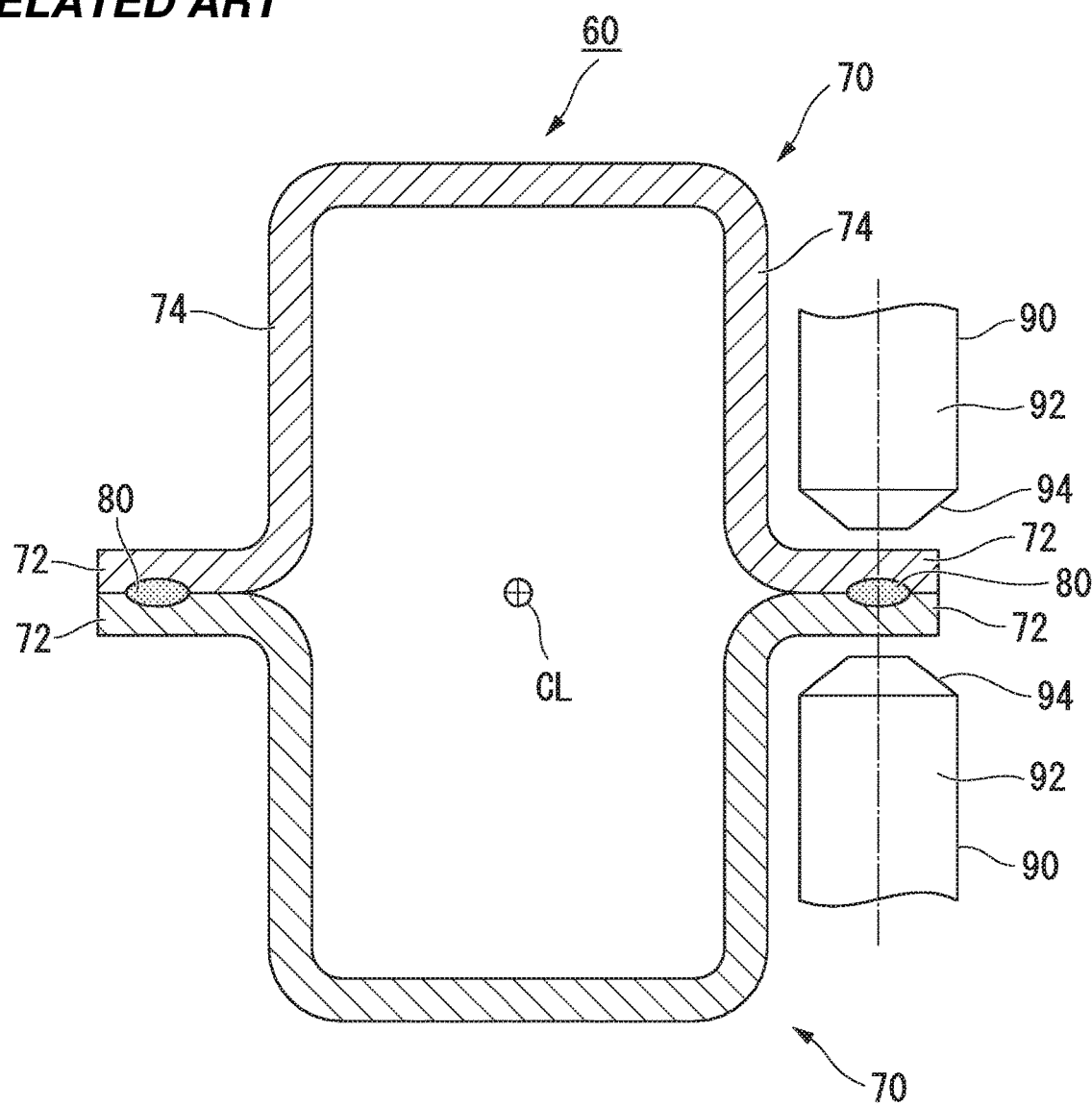
FIG. 16A is a horizontal cross-sectional view showing a lap weld joint of a steel sheet of the related art and is a view for describing a lap welding method of a steel sheet of the related art.
Figure 16B:
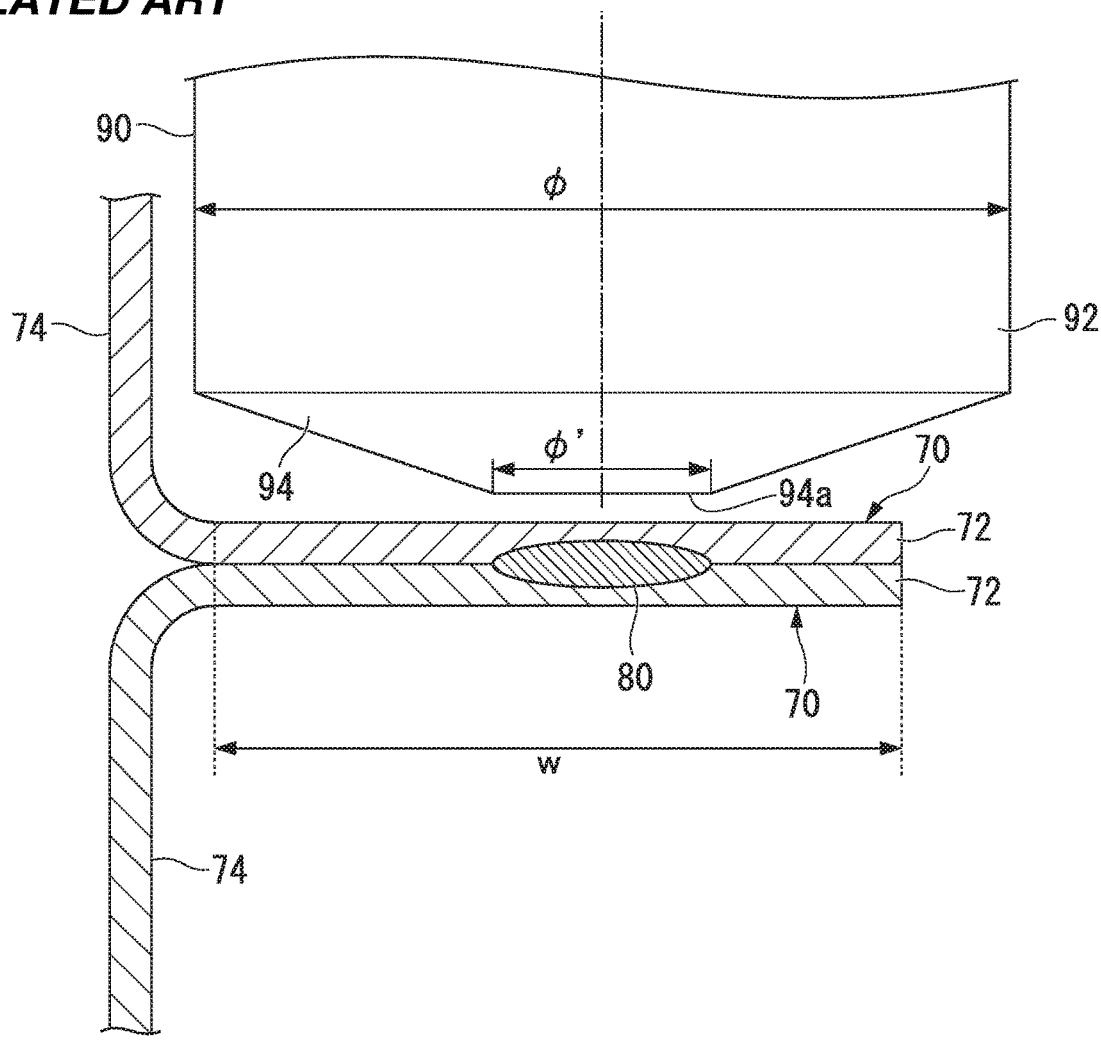
FIG. 16B is a partial enlarged view of FIG. 16A.

FIG. 15 is a horizontal cross-sectional view (a cross-sectional view perpendicular to the longitudinal direction) showing the lap weld joint 200 according to the present embodiment. In the first embodiment, a case in which the lap weld joint 100 is constituted of two steel sheet members 1X and 1Y has been described. In contrast, in the present embodiment, the lap weld joint 200 is constituted of the steel sheet members 1X and 1Y and, furthermore, a steel sheet member 30 having a hat-liked shape and a thinner sheet thickness than the steel sheet members 1X and 1Y as shown in FIG. 15.

Regarding steel sheet components constituting automotive bodies, in steel sheet components made of three or more steel sheet members, there are cases in which the sheet thickness of the steel sheet member that is disposed on the outermost side is thinner than the sheet thicknesses of other steel sheet members (the case of a high sheet thickness ratio). In this case, nuggets that are formed by means of spot welding propagate from the center of the total sheet thickness, and thus, on the overlapping surface between the thin steel sheet member disposed on the outermost side and another steel sheet member disposed on the inside of the above-described thin steel sheet member, nuggets are incapable of easily propagating.

As shown in FIG. 15, the lap weld joint 200 can be obtained by spot-welding and laser-welding three steel sheet members 1X, 1Y, and 30 in the same manner as in the lap welding method of a steel sheet according to the first embodiment. In addition, as shown in FIG. 15, in the lap weld joint 200, the flange portion 2 of the steel sheet member 1X, the flange portion 2 of the steel sheet member 1Y, and a flange portion 32 of the steel sheet member 30 are overlapped with one another, the nugget 110 is formed by spot welding, and the weld bead 120 is formed by laser welding between an R stop 33a of an R portion 3 and the nugget 110 on the R stop 33a side.

In a case in which the steel sheet members having a high sheet thickness ratio are welded together as shown in FIG. 15, there are cases in which the nuggets 110 formed by spot welding propagate from the center of the total sheet thickness and the nuggets do not propagate or barely propagate on the overlapping surface of the flange portion 32 of the steel sheet member 30 having a thin sheet thickness which is disposed on the outermost side and the flange portion 2 of the steel sheet member 1X having a sheet thickness that is thicker than the above-described sheet thickness.

However, for the lap weld joint 200, similar to the lap welding method of a steel sheet according to the first embodiment, spot welding and laser welding are sequentially carried out, and thus the weld beads 120 formed by laser welding are formed astride the steel sheet members 1X, 1Y, and 30. Therefore, in the lap weld joint 200, it is possible to obtain a sufficient joint strength even when there are portions in which the nuggets 110 do not sufficiently propagate on the overlapping surfaces of the steel sheet members 1X, 1Y, and 30.

In addition, in the lap weld joint 200, similar to the case of the first embodiment, spot welding is firstly carried out, and thus the sheet separation phenomenon attributed to the plastic flow of the steel sheet members occurs in the circumferences of the welding portion of the flange portion 2 of the steel sheet member 1X, the flange portion 2 of the steel sheet member 1Y, and the flange portion 32 of the steel sheet member 30. In addition, a gap G is generated between these flange portions due to the sheet separation phenomenon. Therefore, even in the lap weld joint 200, in a case in which the steel sheet members 1X, 1Y, and 30 on which galvanizing has been carried out are laser-welded together, gaps G of substantially 0.05 to 0.4 mm are formed due to the sheet separation phenomenon, and thus zinc vapor is discharged through these gaps G, and it is possible to suppress the scattering (sputtering) of molten steel.

Examples

Next, examples carried out in order to confirm the effects of the present invention will be described.

Steel sheet members were prepared by forming steel sheets having a sheet thickness of 1.2 mm and a tensile strength of 612 MPa into an L-like shape or a hat shape. In order to use as tensile test pieces, for two steel sheet members having an L-like shape, the flange portions thereof were overlapped with each other and spot-welded together. In addition, in order to use as torsional stiffness test pieces, as shown in FIG. 2, for two steel sheet members having a hat shape, the flange portions thereof were overlapped with each other and spot-welded together. In the spot welding, the flange portions of the two steel sheet members were interposed and pressed at a welding pressure of 4 kN in a DR-type electrode having a diameter of 16 mm so that nugget diameters reached 5.5 mm, and the spot welding was carried out at an electric conduction current of 7.5 kA for an electric conduction time of 14 cycles. In addition, the spot welding was carried out at a pitch of 40 mm.

Next, the flange portions were welded together using a fiber laser in a remote laser welding apparatus having a galvanometer mirror. In addition, regarding the shape and disposition of weld beads in the laser welding, the shape and disposition of weld beads shown in FIG. 5 were made. In addition, the width of the weld bead was adjusted by changing the welding rate while fixing the process point output of the laser to 3 kW. In Table 1, the distance D1 from an R stop to the nugget (refer to FIG. 4A), the distance D2 from the R stop to the weld bead, the length L of the weld bead, the pitch P of the spot welding, and the width W of the weld bead are shown. In addition, in each of Test Nos. 1 to 11, a tensile test piece and a torsional stiffness test were produced.

TABLE 1

| Test No. | Distance D1 from R stop to nugget (mm) | Distance D2 from R stop to weld bead (mm) | D2/D1 | Length L of weld bead (mm) | Pitch P of spot welding (mm) | L/P | Width W of weld bead (mm) | Note |
|---|---|---|---|---|---|---|---|---|
| 1 | 5.0 | — | — | — | 40 | — | — | Comparative Example |
| 2 | 5.0 | 0 | 0 | 20 | 40 | 0.50 | 1.2 | Example |
| 3 | 5.0 | 1.0 | 0.20 | 20 | 40 | 0.50 | 1.2 | Example |
| 4 | 5.0 | 2.5 | 0.50 | 20 | 40 | 0.50 | 1.2 | Example |
| 5 | 5.0 | 4.3 | 0.86 | 2 | 40 | 0.05 | 1.2 | Example |
| 6 | 5.0 | 6.0 | 1.20 | 20 | 40 | 0.50 | 1.2 | Comparative Example |
| 7 | 5.0 | 1.0 | 0.20 | 5 | 40 | 0.13 | 1.2 | Comparative Example |
| 8 | 5.0 | 1.0 | 0.20 | 12 | 40 | 0.30 | 1.2 | Example |
| 9 | 5.0 | 1.0 | 0.20 | 40 | 40 | 1.00 | 1.2 | Example |
| 10 | 5.0 | 1.0 | 0.20 | 20 | 40 | 0.50 | 0.4 | Comparative Example |
| 11 | 5.0 | 1.0 | 0.20 | 20 | 40 | 0.50 | 0.8 | Example |

In Table 1, Test No. 1 indicates a comparative example of a case in which only the spot welding was carried out (that is, a case in which the laser welding was not carried out). Test No. 2 indicates an invention example of a case in which D2 was zero, that is, the end portion of the weld bead closest to the R stop 3a was formed on the R stop 3a. Test Nos. 3 and 4, 8 and 9, and 11 indicate invention examples of a case in which D1 was greater than the sum of D2 and W (D1>D2+W) and the end portion 120b of the weld bead 120 was formed on the inside of the end portion 110a of the nugget 110 in the width direction as shown in FIG. 4. Test No. 5 indicates an invention example of a case in which D1 was greater than D2 (D1>D2) and was less than the sum of D2 and W (D1<D2+W) and a part of the weld bead was formed on the nugget.

On the other hand, Test No. 6 indicates a comparative example of a case in which D1 was less than D2 (D1<D2), that is, the weld beads were not formed in a region between the nuggets and the R stop. In addition, Test No. 7 indicates a case in which the diameter Dn (refer to FIG. 6) of the nugget was 5.5 mm, the length L of the weld bead was 5 mm, and thus L was less than Dn, that is, a comparative example. In addition, Test No. 10 indicates a comparative example in which the width W of the weld bead was 0.4 mm and failed to satisfy the range (W=0.5 to 3.0 mm) of the present invention.

In addition, the joint strength and the torsional stiffness of the produced test pieces were measured. The joint strength (the maximum load) was obtained by pulling out both ends of the tensile test piece using a tensile tester and breaking the tensile test piece. Meanwhile, the torsional stiffness was obtained by fixing one end of the torsional stiffness test piece and obtaining the relationship between the torsional moment loaded to the other end and the torsional angle measured at the other end.

In Table 2, the joint strength, the joint strength ratio, the torsional stiffness, and the torsional stiffness ratio are shown. The joint strength ratio and the torsional stiffness ratio are respectively ratios to the joint strength and the torsional stiffness of the case of Test No. 1 (that is, the case of the spot welding alone). In addition, joint strength ratios and torsional stiffness ratios of 1.10 or higher were determined as a pass.

TABLE 2

| Test No. | Joint strength (kN) | Joint strength ratio | Torsional stiffness (Nm/deg) | Torsional stiffness ratio | Note |
|---|---|---|---|---|---|
| 1 | 1.80 | 1.00 | 510 | 1.00 | Comparative Example |
| 2 | 3.39 | 2.12 | 602 | 1.18 | Example |
| 3 | 2.77 | 1.73 | 592 | 1.16 | Example |
| 4 | 2.22 | 1.39 | 571 | 1.12 | Example |
| 5 | 1.92 | 1.20 | 561 | 1.10 | Example |
| 6 | 1.60 | 1.00 | 525 | 1.03 | Comparative Example |
| 7 | 1.89 | 1.18 | 551 | 1.08 | Comparative Example |
| 8 | 2.37 | 1.48 | 571 | 1.12 | Example |
| 9 | 3.55 | 2.22 | 622 | 1.22 | Example |
| 10 | 1.62 | 1.01 | 592 | 1.16 | Comparative Example |
| 11 | 2.42 | 1.51 | 592 | 1.16 | Example |

In Test Nos. 2 to 5, 8, 9, and 11, the constitution of the present invention was fully satisfied, and thus the joint strength ratios and the torsional stiffness ratios were 1.10 or higher. That is, it could be confirmed that, compared with Test No. 1 in which only the spot welding was carried out, the joint strength and the torsional stiffness could be improved. Furthermore, in Test Nos. 2 to 4, 8, 9, and 11, it could be confirmed that D2/D1 was 0.5 or lower and the joint strength ratios and the torsional stiffness ratios became higher.

On the other hand, in Test No. 6, the weld beads were not formed between the R stop and the nuggets, and thus the joint strength ratio and the torsional stiffness ratio were lower than 1.10. In addition, in Test No. 7, the length L of the weld bead was shorter than the diameter Dn of the nugget, and thus the torsional stiffness ratio was lower than 1.10. In addition, in Test No. 10, the width W of the weld bead was less than 0.5 mm, and thus the joint strength ratio was lower than 1.10.

Hitherto, the embodiments of the present invention have been described, but the above-described embodiments are proposed as examples, and the scope of the present invention is not limited only to the above-described embodiments. The above-described embodiments can be carried out in a variety of different forms and can be omitted, substituted, and modified in various manners within the scope of the gist of the invention. The above-described embodiments or modifications thereof are included in the scope of the invention described in the claims and equivalents thereof as if being included in the range or gist of the invention.

For example, in the lap weld joints 100 and 200, the type, the component composition, and the sheet thickness may be fully or partially identical among the respective steel sheet members or may be different among the respective steel sheet members.

In addition, for example, in the lap weld joint 100, the disposition of the nuggets and the weld beads may vary in every flange portion, or it is also possible to, in a flange portion, divide the welding place into a plurality of sections and vary the disposition of nuggets and weld beads in every section.

In addition, for example, in the modification example of the first embodiment, a case in which one weld bead 120 is formed astride a plurality of nuggets 110 has been described (refer to FIG. 8). However, a plurality of weld beads 120 extending astride a plurality of nuggets 110 may be formed.

In addition, for example, in the modification example of the first embodiment, a case in which the shape of the weld bead 123 is an elliptical shape in a plan view has been described (refer to FIG. 11). However, the shape of the weld bead 123 may be a circular shape.

In addition, for example, in the modification example of the first embodiment, a case in which the steel sheet members 1X and 1X' which have a hat-shaped cross section are welded together has been described (refer to FIG. 14). However, a lap weld joint constituted of three steel sheet members may be produced by overlapping the steel sheet 10 (refer to FIG. 13) to these steel sheet members 1X and 1X' from the lower side of the steel sheet member 1X'.

INDUSTRIAL APPLICABILITY

According to the present invention, it is possible to provide a lap welding method of a steel sheet and a lap weld joint which are capable of improving joint strength and torsional stiffness in lap weld joints that are obtained by welding a steel sheet member having flange portions and standing wall portions to another steel sheet member.

BRIEF DESCRIPTION OF THE REFERENCE SYMBOLS

1: steel sheet member
1X: steel sheet member
1Y: steel sheet member
3: R portion
3a: R stop
4: standing wall portion
5: transverse wall portion
100: lap weld joint of steel sheet
110: nugget
120: weld bead
Dn: diameter of nugget
G: gap
L: length of weld bead
W: width of weld bead
X: central axis line

The invention claimed is:
1. A lap welding method of a steel sheet for overlapping and welding a first steel sheet member and a second steel sheet member having a flange portion that is overlapped with the first steel sheet member and a standing wall portion that stands from the flange portion, the method comprising:
spot welding in a state in which the flange portion is overlapped with the first steel sheet member, thereby forming a plurality of nuggets between the first steel sheet member and the flange portion, along a longitudinal direction of the flange portion; and
after the spot welding, laser welding a region between an R stop of the standing wall portion and the nugget, thereby forming a plurality of weld beads along the longitudinal direction of the flange portion,
wherein, the plurality of weld beads is formed at intervals in the longitudinal direction of the flange portion,
in the weld bead, a dimension in a longitudinal direction of the flange portion is equal to or longer than a diameter of the nugget, and a width dimension is 0.5 to 3.0 mm, and
an end portion of the weld bead in a width direction of the flange portion which is farthest from the R stop is located further inside than an end portion of the nugget which is closest to the R stop in the width direction.

2. The lap welding method of a steel sheet according to claim 1,
wherein, when a shortest distance between the R stop of the standing wall portion and the nugget is represented by D1 (mm), and
a shortest distance between the R stop of the standing wall portion and the weld bead is represented by D2 (mm), a ratio D2/D1 of D2 to D1 is ½ or less.

3. The lap welding method of a steel sheet according to claim 2,
wherein, in the laser welding, the weld bead is formed so that an end portion of the weld bead in a width direction is formed in the R stop of the standing wall portion.

4. The lap welding method of a steel sheet according to claim 2,
wherein a shape of the weld bead is a linear shape, a U shape, or a wavy shape.

5. The lap welding method of a steel sheet according to claim 1,
wherein, in the laser welding, the weld bead is formed so that an end portion of the weld bead in a width direction is formed in the R stop of the standing wall portion.

6. The lap welding method of a steel sheet according to claim 5,
wherein a shape of the weld bead is a linear shape, a U shape, or a wavy shape.

7. The lap welding method of a steel sheet according to claim 1,
wherein a shape of the weld bead is a linear shape, a U shape, or a wavy shape.

8. A lap weld joint of a steel sheet comprising:
a first steel sheet member;
a second steel sheet member having a flange portion that is overlapped with the first steel sheet member and a standing wall portion that stands from the flange portion;
a plurality of nuggets along a longitudinal direction of the flange portion that joins the first steel sheet member and the flange portion; and
a plurality of weld beads formed at intervals along the longitudinal direction of the flange portion that joins the first steel sheet member and the flange portion and is formed in a region between an R stop of the standing wall portion and the nugget,
wherein, in the weld bead, a dimension in a longitudinal direction of the flange portion is equal to or longer than a diameter of the nugget, and a width dimension is 0.5 to 3.0 mm, and
an end portion of the weld bead in a width direction of the flange portion which is farthest from the R stop is located further inside than an end portion of the nugget which is closest to the R stop in the width direction.

9. The lap weld joint of a steel sheet according to claim 8,
wherein, when a shortest distance between the R stop of the standing wall portion and the nugget is represented by D1 (mm), and
a shortest distance between the R stop of the standing wall portion and the weld bead is represented by D2 (mm),
a ratio D2/D1 of D2 to D1 is ½ or less.

10. The lap weld joint of a steel sheet according to claim 9,
wherein an end portion of the weld bead in a width direction is formed in the R stop of the standing wall portion.

11. The lap weld joint of a steel sheet according to claim 9,
wherein the weld bead has a linear, U-like, or wavy shape.

12. The lap weld joint of a steel sheet according to claim 8,
wherein an end portion of the weld bead in a width direction is formed in the R stop of the standing wall portion.

13. The lap weld joint of a steel sheet according to claim 12,
wherein the weld bead has a linear, U-like, or wavy shape.

14. The lap weld joint of a steel sheet according to claim 8,
wherein the weld bead has a linear, U-like, or wavy shape.

* * * * *